US007124288B2

(12) United States Patent
Panis et al.

(10) Patent No.: US 7,124,288 B2
(45) Date of Patent: Oct. 17, 2006

(54) PROGRAMMABLE UNIT WITH A STACK BUFFER STORAGE DEVICE CONFIGURABLE INTO DISCRETE SHADOW STORAGE ELEMENTS ACCESSIBLE BY A PLURALITY OF COMMAND EXECUTION UNITS

(75) Inventors: Christian Panis, Vienna (AT); Raimund Leitner, Moosburg (AT)

(73) Assignee: Infineon Technologies AG, Munich (DE)

( * ) Notice: Subject to any disclaimer, the term of this patent is extended or adjusted under 35 U.S.C. 154(b) by 373 days.

(21) Appl. No.: 10/194,899

(22) Filed: Jul. 12, 2002

(65) Prior Publication Data

US 2003/0028756 A1  Feb. 6, 2003

(30) Foreign Application Priority Data

Jul. 12, 2001 (DE) ................................. 101 33 913

(51) Int. Cl.
*G06F 9/00* (2006.01)

(52) U.S. Cl. ...................... 712/244; 712/228; 712/218; 712/202

(58) Field of Classification Search ................ 712/202, 712/218, 228, 244
See application file for complete search history.

(56) References Cited

U.S. PATENT DOCUMENTS 5,475,822 A * 12/1995 Sibigtroth et al. .......... 712/228
5,604,915 A * 2/1997 Moore et al. ................. 710/60
5,640,582 A * 6/1997 Hays et al. .................... 712/38
5,857,089 A    1/1999 Goddard et al.
5,974,531 A * 10/1999 Shang et al. ................ 712/202
6,088,786 A *  7/2000 Feierbach et al. .......... 712/200

OTHER PUBLICATIONS

Hennessy and Patterson. Computer Organization and Design, Morgan Kaufmann Publishers, Inc. 1998. pp. 510-515 and 667-669.*
Sima et al., Advanced Computer Architectures, Addison-Wesley, 1997, pp. 212-215.*
Jargon File, definition of "stack", from www.dictionary.com, 1995, pp. 1-5..*

(Continued)

*Primary Examiner*—Eddie Chan
*Assistant Examiner*—Kevin P. Rizzuto
(74) *Attorney, Agent, or Firm*—Laurence A. Greenberg; Werner H. Stemer; Ralph E. Locher

(57) ABSTRACT

A programmable unit includes a command execution unit for carrying out commands, a memory device for storing data required for command execution and data emitted from the command execution unit, and a buffer-storage device for buffer storing the data emitted from the command execution unit. The command execution unit writes to the buffer-storage device data to be transferred to the memory device. The data written to the buffer storage device is transferred to the memory device at a later time. The programmable unit is distinguished by forming the buffer-storage device as a stack, and/or by providing a control apparatus that, when required, causes data stored in the buffer-storage device to be moved temporarily to another memory device. Such a programmable unit can carry out any buffer storage of events that may possibly be required quickly and easily in all circumstances.

28 Claims, 4 Drawing Sheets

OTHER PUBLICATIONS

Hennessy and Patterson. Computer Organization and Design, Morgan Kaufmann Publishers, Inc. 1998. pp. 667-670, 191-192.*

No author, picoJava -I Microprocessor Core Architecture, White Paper, Oct. 1996.*

Goodman and Miller, A Programmer's View of Computer Architecture, Oxford University Press, 1993, pp. 167-168, 182-184.*

No author, IEEE Standard for Simple 32-Bit Backplane Bus: NuBus, IEEE, Inc., pp. 33-41.*

Rodney Zaks: "programmierung des 6502" [programming the 6502], SYBEX, Inc., 1980, 1st German ed. of the 3rd U.S. ed., pp. 42-43.

* cited by examiner

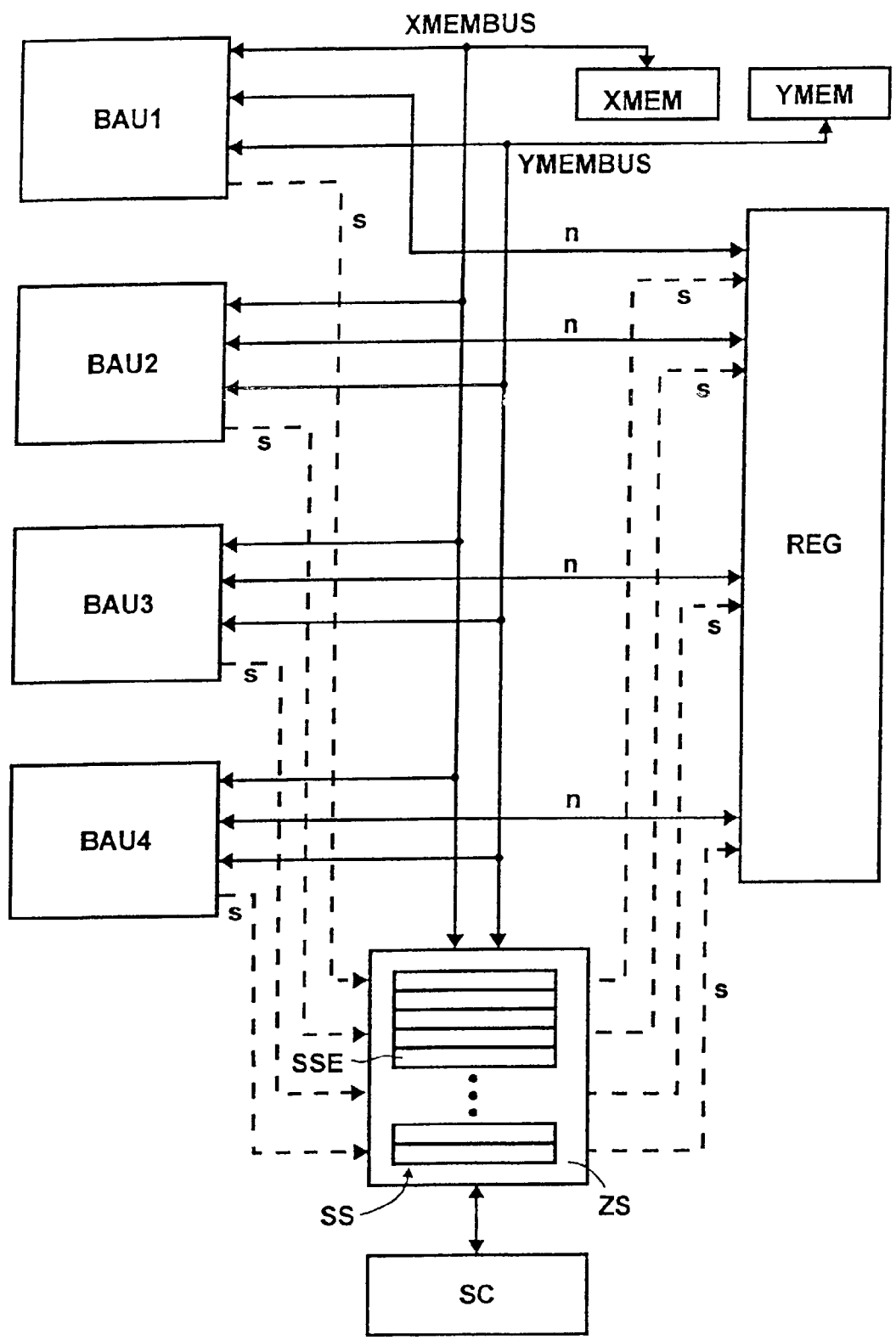
FIG 1

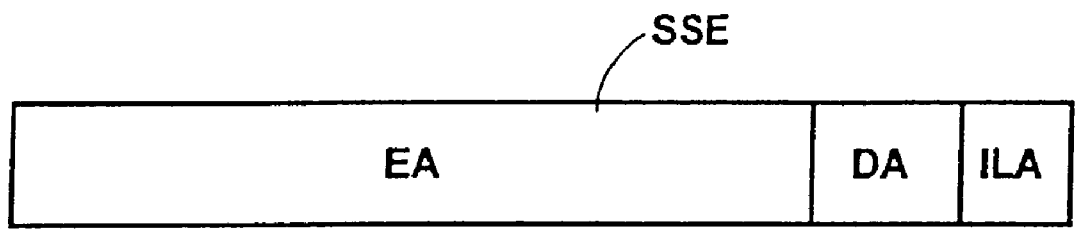
FIG 2
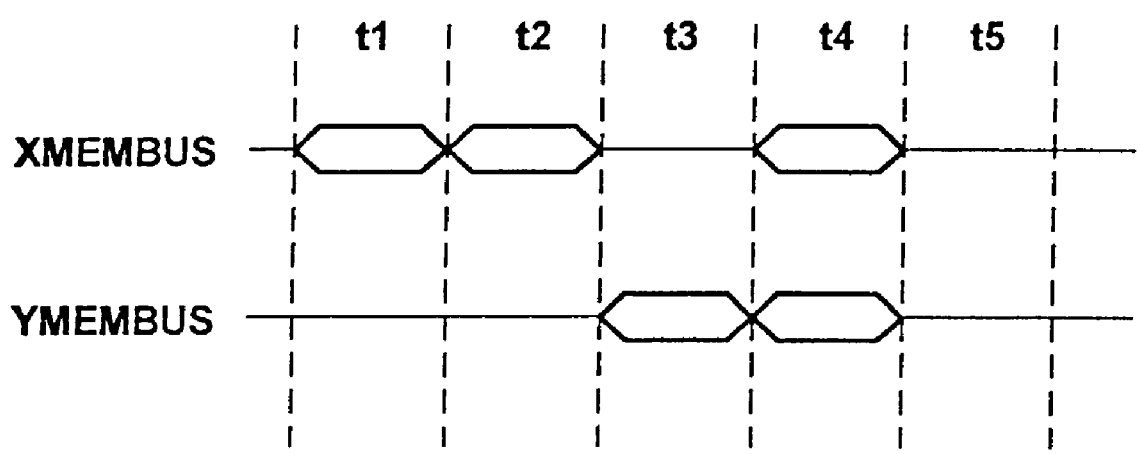
FIG 3

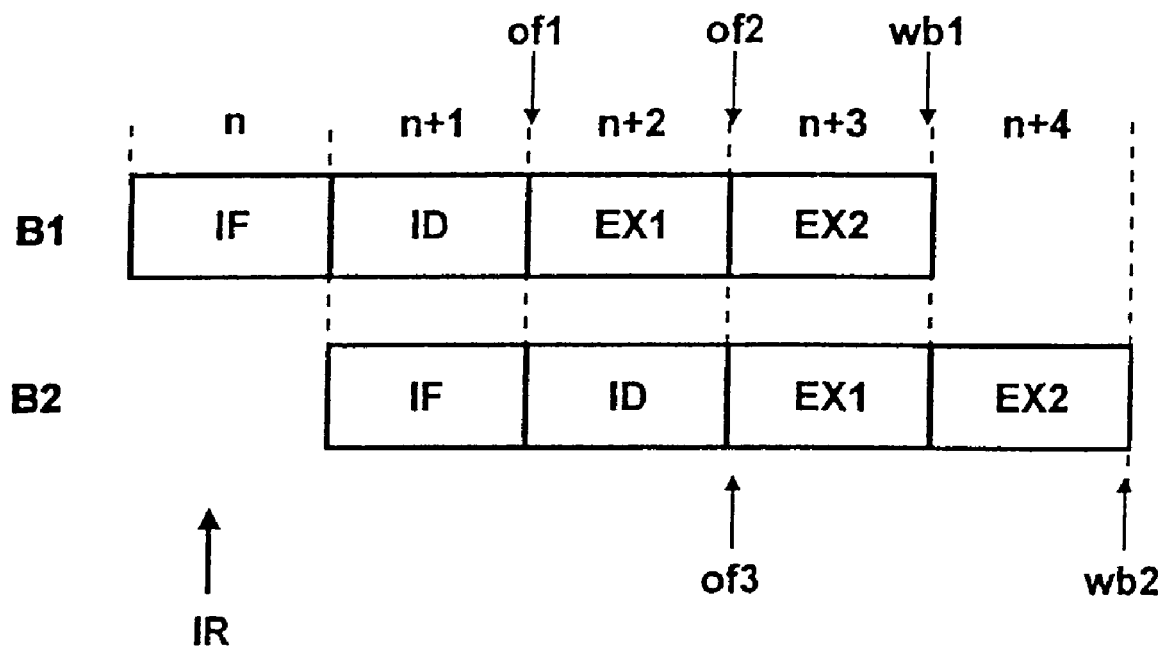
Prior Art
FIG 4
Prior Art
FIG 5

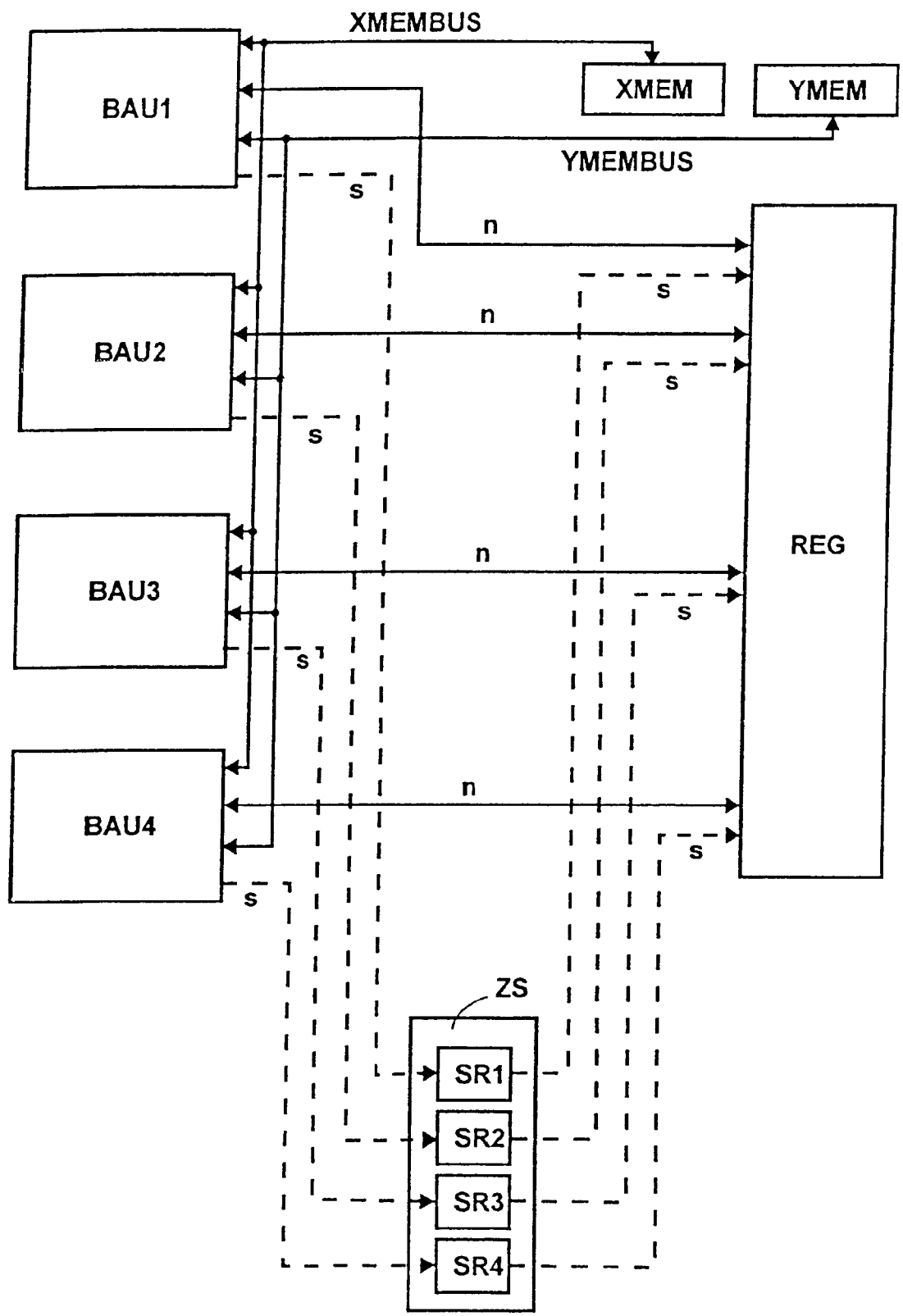
Prior Art
FIG 6

PROGRAMMABLE UNIT WITH A STACK BUFFER STORAGE DEVICE CONFIGURABLE INTO DISCRETE SHADOW STORAGE ELEMENTS ACCESSIBLE BY A PLURALITY OF COMMAND EXECUTION UNITS

BACKGROUND OF THE INVENTION

Field of the Invention

The present invention relates to a programmable unit having a command execution unit for carrying out commands that are to be carried out by the programmable unit, a memory device for storing data required for command execution and data emitted from the command execution unit, and a buffer-storage device for buffer storing the data emitted from the command execution unit, with the command execution unit writing to the buffer-storage device data that is to be transferred to the memory device, and with the data that is written to the buffer-storage device being transferred to the memory device at a later time.

Such programmable units are microprocessors, microcontrollers, signal processors, etc., innumerable embodiments of which have been in the prior art for many years.

The buffer-storage device mentioned above is required, for example, when a command execution pipeline is used that has a number of command execution stages.

Such a command execution pipeline is illustrated in FIG. 4.

The command execution pipeline illustrated in FIG. 4 includes an instruction fetch stage IF, an instruction decode stage ID, a first command execution stage EX1, and a second command execution stage EX2, with a command that is to be executed:

being obtained from a program memory in the instruction fetch stage IF;
being decoded in the instruction decode stage ID; and
being carried out in the execution stages EX1 and EX2.

In certain circumstances, problems can arise in a command execution pipeline such as this, as will be described in detail in the following text with reference to an example.

The example relates to two commands that are to be carried out successively:
mac d0, d1, a3 (command B1); and
add d6, d2, d4 (command B2), with the operation a3=a3+d0*d1 being carried out by the command B1, and the operation d4=d6+d2 being carried out by the command B2, and with:

the operands d0 and d1 being components of a value a0 that is read as a cohesive unit from the data memory and written to the data memory;
the operand d2 being a component of a value a1 that includes the operand d2 and a further operand d3, is read as a cohesive unit from the data memory and is written to the data memory;
the operand d4 being a component of a value a2 that includes the operand d4 and a further operand d5, is read as a cohesive unit from the data memory and is written to the data memory; and
the operand d6 being a component of the value a3, which includes the operand d6 and a further operand d7, is read as a cohesive unit from the data memory and is written to the data memory.

FIG. 5 illustrates the time sequence for carrying out the commands B1 and B2.

The execution of the command B1 is started using a clock n; retrieval from the program memory takes place using the clock n, the clock n+1 is used for decoding, and execution takes place using the clocks n+2 and n+3, with:

the operands d0 and d1 being read from the data memory at the start of the first execution stage EX1, to be more precise, at a time that is referred to by the reference symbol of1 in FIG. 5;
the operand a3 being read from the data memory at the start of the second execution stage EX2, to be more precise at a time that is referred to by the reference symbol of2 in FIG. 5; and
the operand a3 being emitted to the data memory at the end of the second execution stage EX2, to be more precise at a time that is referred to by the reference symbol wb1 in FIG. 5.

The execution of the command B2 is started using a clock n+1; retrieval from the program memory takes place using the clock n+1, the clock n+2 is used for decoding, and execution takes place using the clocks n+3 and n+4, with:

the operands d6 and d2 being read from the data memory at the start of the first execution stage EX1, to be more precise at a time that is referred to by the reference symbol of3 in FIG. 5; and
the operand d4 being emitted to the data memory at the end of the second execution stage EX2, to be more precise at a time that is referred to by the reference symbol wb2 in FIG. 5.

As can be seen from the explanatory notes above, a3 is accessed not only by the command B1 but also by the command B2: B1 at the time of2 to obtain a3 and at the time wb1 to write back a3, and command B2 at the time of3 to obtain d6 that, as has already been mentioned above, is a part of a3.

In the normal situation as illustrated in FIG. 5, in which the commands B1 and B2 are carried out immediately successively as shown, the command B2 accesses a3 before a3 is modified by the command B1 (of3 occurs before wb1).

However, such is not the case if other commands, for example, the commands for an interrupt service routine, are carried out between the commands B1 and B2.

If an interrupt request IR using the clock n occurs, the command B1 is still carried out first of all, and the commands for the interrupt service routine, which have to be carried out in response to the interrupt request, are carried out next, and the command B2 is not carried out until the interrupt has been done.

Because the execution of the command B2 does not start until after the end of the execution of the command B1, the operand d6 that is used by the command B2 has a different value than would be the case if B1 and B2 were carried out immediately successively as shown in FIG. 5; the time at which d6 (a3) is read from the data memory in this case occurs after the time wb1, at which the content of a3 is modified by the command B1. It should be obvious, and requires no further explanation, that B2 results in a different result than would have been the case if B1 and B2 had been carried out immediately successively, as shown in FIG. 5.

The buffer-storage device that has already been mentioned in the introduction is provided in order to avoid such an event.

A programmable unit that contains such a buffer-storage device is illustrated in FIG. 6. The configuration shown in FIG. 6 is a component of a superscalar processor and contains:

command execution units BAU1, BAU2, BAU3 and BAU4;

a first memory device REG;

a second memory device XMEM;

a third memory device YMEM; and a buffer storage device ZS, where:

the command execution units BAU1 to BAU4 are command execution units that operate in parallel and can each carry out one command at the same time, which means that a group of commands that includes up to four commands and is referred to as a command bundle in the following text can be carried out simultaneously;

the command execution units BAU1 and BAU2 are so-called load/store units that carry out commands by which data that is stored in the first memory device REG can be transferred to the second memory device XMEM or to the third memory device YMEM, or vice-versa;

the command execution units BAU3 and BAU4 are so-called arithmetic/logic units, which carry out arithmetic and/or logic commands, with operands that are required for command execution being obtained from the first memory device REG, and with the results of the command execution being written either to the first memory device REG or the buffer-storage device ZS;

the first memory device REG is a register bank that contains a large number of registers; and the buffer-storage device ZS contains four buffer-storage elements that are formed by so-called shadow registers, with the first shadow register SR1 being associated with the first command execution unit BAU1, the second shadow register SR2 being associated with the second command execution unit BAU2, the third shadow register SR3 being associated with the third command execution unit BAU3, and the fourth shadow register SR4 being associated with the fourth command execution unit BAU4.

The execution of the commands that are to be carried out by the command execution units BAU1 to BAU4 may include the transfer of data from the command execution units to the first memory device REG. In such a case, the procedure is described in the following text.

Normally, that is to say, when the processing of the program to be carried out is not interrupted or delayed by an interrupt request or any other circumstances, the data emitted from the command execution devices BAU1 to BAU4 is written (without passing through the buffer-storage device ZS) to the first memory device REG; this is illustrated in FIG. 6 by arrows that are referred to by the reference symbol n.

In particular situations, for example, when carrying out the last command bundle before carrying out an interrupt service routine, the command execution units BAU1 to BAU4 emit to the buffer-storage device ZS the data that is to be transferred to the first memory device REG, and the data that is written to the buffer-storage device ZS is passed on to the first memory device REG at a later time, with the time at which it is passed on being chosen such that the passing-on process takes place at the end of the first execution phase EX1 of the command bundle that is to be carried out after the interrupt service routine. This makes it possible for the command bundle that is to be carried out after the interrupt service routine to be carried out in all circumstances in precisely the same way as it would have been if the interrupt service routine, or interruptions of this type, had not been carried out in the meantime. The process is illustrated in FIG. 6 by arrows that are denoted by the reference symbol s.

In practice, the provision of just the buffer-storage device ZS as shown in FIG. 6 is frequently not sufficient to ensure disturbance-free operation of the programmable unit. Such is the case, by way of example, when it is necessary to interrupt the execution of an interrupt service routine because a higher-priority interrupt has occurred and a further interrupt service routine must be carried out within the interrupt service routine. In such a case, further data that has been emitted from command execution units BAU1 to BAU4, to be precise, based upon the commands in the last command bundle, must be buffer-stored before carrying out the second interrupt service routine. However, due to the fact that data that has not yet been passed on to the first memory device REG has been stored, or can be stored, in the buffer-storage device ZS until the relevant time, special measures must be taken for such a purpose, with these measures enlarging the hardware (larger buffer-storage device) and/or slowing down the program execution (movement of the results that are stored in the buffer-storage device by load/store commands that are carried out in the command execution units BAU1 and BAU2).

SUMMARY OF THE INVENTION

It is accordingly an object of the invention to provide a programmable unit that overcomes the hereinafore-mentioned disadvantages of the heretofore-known devices of this general type and that carries out any buffer storage that may be required for data that has been emitted from the command execution units quickly and easily, in all circumstances.

With the foregoing and other objects in view, there is provided, in accordance with the invention, a programmable unit, including a command execution unit adapted to execute commands and to emit data, a memory device connected to the command execution unit and adapted to store data required for execution of the commands and to store the data emitted from the command execution unit, a buffer-storage device in the form of a stack, the buffer-storage device connected to the command execution unit and to the memory device and adapted to buffer store the data emitted from the command execution unit, the command execution unit adapted to write to the buffer-storage device data to be transferred to the memory device, and the buffer-storage device adapted to transfer the data written to the buffer-storage device to the memory device at a later point in time.

With the objects of the invention in view, there is also provided a programmable unit, including a command execution unit adapted to execute commands and to emit data, a first memory device connected to the command execution unit and adapted to store data required for execution of the commands and to store the data emitted from the command execution unit, a buffer-storage device connected to the command execution unit and to the memory device and adapted to buffer store the data emitted from the command execution unit, a second memory device connected to the buffer-storage device, the command execution unit adapted to write to the buffer-storage device data to be transferred to the first memory device, the buffer-storage device adapted to transfer the data written to the buffer-storage device to the first memory device at a later point in time, and a control apparatus connected to the buffer-storage device, the control apparatus adapted to cause data stored in the buffer-storage device to be moved temporarily to the second memory device when required.

The programmable units according to the invention are distinguished:

in that the buffer-storage device is formed by a stack; and/or in that a control apparatus is provided, which, when required, causes data that is stored in the buffer-storage device to be moved temporarily to another memory device.

The implementation of the buffer-storage device as a stack has been found to be advantageous for a number of reasons.

Firstly, the buffer-storage device may in consequence contain two or more buffer-storage elements for each command execution unit and even—more importantly—these buffer-storage elements, to be more precise, autonomously administer, without any significant complexity:

the writing of data to the buffer-storage elements;

temporary movement of the data that is stored in the buffer-storage elements to another memory device; and/or the passing on of the data that is stored in the buffer-storage elements to the memory device for which they are intended.

On the other hand, a buffer-storage device that is formed by a stack may be used very efficiently. In particular, and in contrast to the situation when the buffer-storage device is implemented by shadow registers, it is always possible to use all the buffer-storage elements in which no data is buffer-stored for the buffer-storage of data. The reason for this is that, if the buffer-storage device is in the form of a stack, there is no need to associate each individual buffer-storage element with a specific command execution unit in a fixed manner, that is to say, each command execution unit may write to each buffer-storage element, and in situations in which it is necessary to buffer-store data, no more buffer-storage elements are used than is necessary for buffer-storage of the data to be buffer-stored (because those command execution units that have no data to emit do not write to any buffer-storage element, or use it in any other way).

Because a control apparatus is provided that, when required, causes data that is stored in the buffer-storage device to be moved temporarily to another memory device, it can be ensured, even in the case of a buffer-storage device with only a small number of buffer-storage elements, that data to be buffer-stored can be buffer-stored at any time, and without any restrictions. Due to the fact that the movement process that has been mentioned is carried out by a dedicated control device and, furthermore, also only when this is necessary, that is to say, by way of example, it is carried out only when there is a threat of the buffer-storage device overflowing, the movement of data that is stored in the buffer-storage device to another memory device has only minor effects on the construction of the programmable unit and no effects whatsoever on the program to be executed or on the execution process itself.

In accordance with another feature of the invention, there is provided a second memory device and a control apparatus adapted to temporarily move data stored in the buffer-storage device to the second memory device when required.

In accordance with a further feature of the invention, there is provided a second memory device and a control apparatus adapted to cause data stored in the buffer-storage device to be moved to the second memory device when required.

In accordance with an added feature of the invention, the control apparatus is adapted to check if a threat of the buffer-storage device overflowing is imminent, and, if so, the control apparatus is adapted to cause data stored in the buffer-storage device to be transferred to the second memory device.

In accordance with an additional feature of the invention, the control apparatus is adapted to check if a threat of the buffer-storage device becoming empty is imminent, and, if so, the control apparatus is adapted to cause data moved to the second memory device to be transferred back to the buffer-storage device.

In accordance with yet another feature of the invention, there is provided a bus connected to the buffer-storage device and to the second memory device, the bus adapted to transfer data between the buffer-storage device and the second memory device, the control apparatus adapted to automatically receive, without any separate check by the control apparatus, information regarding a current use status of the bus by any of the buffer-storage device and the second memory device.

In accordance with yet a further feature of the invention, the control apparatus is adapted to cause data transfer between the buffer-storage device and the second memory device to be carried out in time periods during which the bus is not being used by any one of the buffer-storage device and the second memory device.

In accordance with yet an added feature of the invention, the control apparatus is adapted to request allocation of the bus to carry out required data transfer between the buffer-storage device and the memory device if at least one of the following is true: no time periods are available, a sufficient number of time periods are not available, and no time periods of sufficient length are available.

In accordance with yet an additional feature of the invention, the command execution unit is a plurality of command execution units.

In accordance with again another feature of the invention, the command execution units are each adapted to execute at least one of the commands simultaneously.

In accordance with again a further feature of the invention, the buffer-storage device is adapted to buffer store the data emitted from the command execution unit only when one of a predetermined list of events occurs.

In accordance with again an added feature of the invention, the buffer-storage device is adapted to buffer-store data emitted from the command execution unit only when one of commands and command groups regularly carried out immediately successively are not carried out immediately successively.

In accordance with again an additional feature of the invention, the buffer-storage device is adapted to buffer-store data emitted from the command execution unit only when one of commands and command groups regularly carried out immediately successively are not carried out immediately successively due to an interrupt service routine being carried out therebetween.

In accordance with still another feature of the invention, the data stored in the buffer-storage device includes information about a later point in time at which the data is to be passed on to the memory device.

In accordance with a concomitant feature of the invention, the data stored in the buffer-storage device includes information from which a time at which the data is to be passed on to the memory device can be determined.

Other features that are considered as characteristic for the invention are set forth in the appended claims.

Although the invention is illustrated and described herein as embodied in a programmable unit, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 1 is a block circuit diagram of relevant portions of a programmable unit according to the invention;

FIG. 2 is a block diagram of an element of a shadow stack of FIG. 1;

FIG. 3 is timing diagram illustrating times at which data stored in the shadow stack of FIG. 1 is moved and retrieved again;

FIG. 4 is a block diagram of a prior art command execution pipe-line for use when indicating that buffer-storage of data may be required;

FIG. 5 is a block timing diagram illustrating problems occurring when using the command execution pipeline of FIG. 4; and FIG. 6 is a block circuit diagram of relevant parts of a prior art programmable unit.

DESCRIPTION OF THE PREFERRED EMBODIMENTS

The programmable unit that is described in more detail in the following text is a signal processor with a superscalar architecture, to be more precise, a signal processor with a dual Harvard load/store architecture.

It should be mentioned at this point that the special features of the programmable unit that are described in more detail in the following text may also be used with other programmable units such as microprocessors and microcontrollers, and that the special features may also advantageously be used for programmable units without a super-scalar-architecture.

The fundamental configuration of the programmable unit under consideration corresponds to the construction that is shown in FIG. 6 and is described with reference thereto; the relevant differences are the implementation and the administration of the buffer-storage device.

One of the special features of the buffer-storage device is that it is formed by a stack (by a FILO memory), which is referred to as a shadow stack in the following text.

Referring now to the figures of the drawings in detail and first, particularly to FIG. 1 thereof, there is shown a programmable unit having a buffer-storage device according to the invention. For the sake of completeness, it should be mentioned that only those components of the programmable unit under consideration that are of particular interest in the present case are illustrated and described.

The illustrated programmable unit includes:
command execution units BAU1, BAU2, BAU3 and BAU4;
a first memory device REG;
a second memory device XMEM;
a third memory device YMEM;
a buffer-storage device ZS; and
a stack control device SC.

The buffer-storage device ZS is formed by a stack, to be more precise, by a stack that is referred to as a shadow stack in the following text and is denoted by the reference symbol SS in FIG. 1, and the command execution units BAU1, BAU2, BAU3 and BAU4, the first memory device REG, the second memory device XMEM, and the third memory device YMEM correspond to those elements that are referred to by these reference symbols in the configuration shown in FIG. 6.

The data that is emitted from the command execution units based upon the commands in the command bundle that is carried out immediately before execution of an interrupt service routine or any other program execution interruption is respectively written to the shadow stack SS. The data is stored in the shadow stack until the end of the interrupt service routine and is then passed on to the first memory device REG, to be more precise, at the end of the first execution phase EX1 of the command bundle that is to be carried out after completion of the interrupt service routine.

The shadow stack SS contains a large number of memory elements SSE, each of which contains:
a result section EA for storing the data that is emitted from one of the command execution units;
a destination section DA for storing the point within the first memory device REG to which the data that is stored in the result section EA is to be transferred later; and
an interrupt level section ILA for storing the interrupt level, that is to say, for storing the interrupt service routine interleaving depth at the time at which the command is carried out, which resulted in the data that was stored in the result section EA being emitted from one of the command execution units, where:
ILA=0 means that the data that is stored in the result section EA has been emitted in response to a command in the command bundle from one of the command execution units, which command bundle was carried out immediately before carrying out an interrupt service routine that has interrupted the "normal" program;
ILA=1 means that the data that is stored in the result section EA has been emitted in response to a command in the command bundle from one of the command execution units, which command bundle was carried out immediately before carrying out a second interrupt service routine that has interrupted a first interrupt service routine; and
ILS=n means that the data that is stored in the result section EA has been emitted in response to a command in the command bundle from one of the command execution units, which command bundle was carried out immediately before carrying out an n-th interrupt service routine that has interrupted an (n−1)th interrupt service routine.

The implementation of the buffer-storage device by a stack and the storage of suitable additional information about the origin and the destination of the results that are to be buffer stored in the stack mean that—in contrast to the shadow registers in the conventional configuration as shown in FIG. 6—neither the stack (the shadow stack SS) nor its memory elements (the memory elements SSE) need be associated with a specific command execution unit. Any command execution unit may write to any memory element; it is also possible to determine uniquely that results are passed on when and where to, using the additional information that is stored in the memory elements, even without associating the memory elements with the command execution units.

A buffer-storage device that is in the form of a stack can, thus, be used more efficiently than a buffer-storage device in the form of shadow registers. In particular, it is possible to prevent a command execution unit that has no data to emit from writing to a buffer-storage element (a shadow stack element SSE), or from using it in some other way or rendering it unusable for any other purpose.

The administration of the stack (in particular, of the write and read pointers) and the passing on of the data that is stored in the stack to the first memory device REG are carried out by the stack control device SC, which is contained in the stack or is associated with the stack.

In the example under consideration, the stack control device also causes, when required, the data that is stored in the shadow stack SS to be temporarily moved to another memory device.

To be more precise, the stack control device SC:
checks whether there is a threat of the shadow stack SS overflowing in the immediate future and, if this is found to be the case, causes data that is stored in the shadow stack SS to be transferred to the other memory device; and
checks whether there is a threat of the shadow stack SS becoming empty in the immediate future, and, if this is found to be the case, causes data that has been moved to the other memory device to be transferred back to the shadow stack SS.

The other memory device that has been mentioned is, in the example under consideration, formed by the second memory device XMEM and/or by the third memory device YMEM.

If possible, the data is transferred between the shadow stack SS and the second memory device XMEM or the third memory device YMEM using so-called cycle stealing. For such a purpose:
without any separate check by the stack control device, the stack control device SC automatically receives information on whether or not a bus through which the data is transferred between the shadow stack SS and the second memory device XMEM or the third memory device YMEM is required at that time by any other of the units that are connected to the bus;
if possible, the stack control device SC causes the data transfer that may be required between the shadow stack SS and the second memory device XMEM or the third memory device YMEM to be carried out in time periods in which the bus is not required by any of the other units that are connected to the bus; and
in order to carry out the necessary data transfer SC, the stack control device requests the allocation of the bus only when no time periods are available, or if a sufficient number of time periods is not available, and/or no time periods of sufficient length are available, in which time periods the bus is not required by any of the other units that are connected to the bus (cycle stalling).

In the example under consideration, the bus is:
a bus that is referred to in FIG. 1 as XMEMBUS and connects the command execution units BAU1 to BAU4, the second memory device XMEM and the shadow stack SS; and/or
a bus that is referred to in FIG. 1 as YMEMBUS and connects the command execution units BAU1 to BAU4, the third memory device YMEM and the shadow stack SS.

The procedure that is carried out by the stack control device in the event of a need to move data that is stored in the shadow stack can be explained with reference to FIG. 3.

FIG. 3 shows clock cycles for the bus XMEMBUS and the bus YMEMBUS that are required by the command execution units BAU1 and BAU2 or by any other unit of the units (apart from the stack control device) that are connected to the buses.

As can be seen from FIG. 3:
the bus XMEMBUS is busy in the clock cycles t1, t2, and t4 and is free in the clock cycles t3 and t5; and
the bus YMEMBUS is busy in the clock cycles t3 and t4 and is free in the clock cycles t1, t2, and t5.

The stack control device receives:
in the clock cycles t1 and t2, information about whether or not the bus YMEMBUS is free;
in the clock cycle t3, information about whether or not the bus XMEMBUS is free; and
in the clock cycle t5, information about whether or not the bus XMEMBUS and the bus YMEMBUS are free, and can, without having to request the bus:
use the bus YMEMBUS in the clock cycles t1 and t2;
use the bus XMEMBUS in the clock cycle t3; and
use the bus XMEMBUS and the bus YMEMBUS in the clock cycle t5, to transmit data between the shadow stack SS and the second memory device XMEM and/or YMEM.

It is, thus, possible for no time delays to occur in program execution as a result of data being temporarily moved from the shadow stack.

For the sake of completeness, it should be mentioned:
that the described movement of data that is stored in the buffer-storage device ZS to another memory device may also be used for programmable units whose buffer-storage device is formed by shadow registers as illustrated in FIG. 6; and
that the implementation of the buffer-storage device by a stack has been found to be advantageous even without the described movement of data that is stored in the buffer-storage device to another memory device.

With the programmable unit as described, it is possible regardless of the details of the practical implementation to carry out any buffer-storage that may be required of data that is emitted from a command execution unit, quickly and easily in all circumstances.

We claim:

1. A programmable unit, comprising:
a plurality of command execution units adapted to execute commands and to emit data;
a memory device connected to said command execution units and adapted to store data required for execution of the commands and to store the data emitted from said command execution units;
a buffer-storage device in the form of a stack, said buffer-storage device:
connected to said command execution units and to said memory device, said command execution units being directly connected to said buffer-storage device;
adapted to buffer store the data emitted from said command execution units; and
said stack configured as a plurality of shadow stack elements, each of said plurality of command execution units being capable of writing to any of said shadow stack elements, as needed;
each of said command execution units adapted to write to said buffer-storage device data to be transferred to said memory device; and
said buffer-storage device adapted to transfer the data written to said buffer-storage device to said memory device at a later point in time.

2. The programmable unit according to claim 1, including:
 a second memory device; and
 a control apparatus adapted to temporarily move data stored in said buffer-storage device to said second memory device when required.

3. The programmable unit according to claim 1, including:
 a second memory device; and
 a control apparatus adapted to cause data stored in said buffer-storage device to be moved to said second memory device when required.

4. The programmable unit according to claim 2, wherein said control apparatus is adapted to check if a threat of said buffer-storage device overflowing is imminent, and, if so, said control apparatus is adapted to cause data stored in said buffer-storage device to be transferred to said second memory device.

5. The programmable unit according to claim 2, wherein said control apparatus is adapted to check if a threat of said buffer-storage device becoming empty is imminent, and, if so, said control apparatus is adapted to cause data moved to said second memory device to be transferred back to said buffer-storage device.

6. The programmable unit according to claim 2, including a bus connected to said buffer-storage device and to said second memory device, said bus adapted to transfer data between said buffer-storage device and said second memory device, said control apparatus adapted to automatically receive, without any separate check by said control apparatus, information regarding a current use status of said bus.

7. The programmable unit according to claim 6, wherein said control apparatus is adapted to cause data transfer between said buffer-storage device and said second memory device to be carried out in phases during which said bus is not being used.

8. The programmable unit according to claim 6, wherein said control apparatus is adapted to request allocation of said bus to carry out required data transfer between said buffer-storage device and said memory device if a sufficient number of time periods are not available for use by said buffer-storage device or said second memory device.

9. The programmable unit according to claim 1, wherein said command execution units are each adapted to execute at least one of the commands simultaneously.

10. The programmable unit according to claim 1, wherein said buffer-storage device is adapted to buffer store the data emitted from said command execution units only when one of a predetermined list of events occurs.

11. The programmable unit according to claim 10, wherein said buffer-storage device is adapted to buffer-store data emitted from said command execution units only when one of commands and command groups regularly carried out immediately successively are not carried out immediately successively.

12. The programmable unit according to claim 11, wherein said buffer-storage device is adapted to buffer-store data emitted from said command execution units only when one of commands and command groups regularly carried out immediately successively are not carried out immediately successively due to an interrupt service routine being carried out therebetween.

13. The programmable unit according to claim 12, wherein the data stored in said buffer-storage device includes information about a destination to which the data is to be passed on to said memory device.

14. The programmable unit according to claim 1, wherein the data stored in said buffer-storage device includes information from which a time at which the data is to be passed on to said memory device can be determined.

15. A programmable unit, comprising:
 a plurality of command execution units adapted to execute commands and to emit data;
 a first memory device connected to said command execution units and adapted to store data required for execution of the commands and to store the data emitted from said command execution units;
 a buffer-storage device:
  connected to said command execution units and to said first memory device, said command execution units being directly connected to said buffer-storage device;
  adapted to buffer store the data emitted from said command execution units; and
  configurable into discrete shadow storage elements, each of said plurality of command execution units being capable of writing to any of said shadow storage elements, as needed;
 a second memory device connected to said buffer-storage device;
 said command execution units adapted to write to said buffer-storage device data to be transferred to said first memory device;
 said buffer-storage device adapted to transfer the data written to said buffer-storage device to said first memory device at a later point in time; and
 a control apparatus connected to said buffer-storage device, said control apparatus adapted to cause data stored in said buffer-storage device to be moved temporarily to said second memory device when required.

16. The programmable unit according to claim 15, wherein said control apparatus is adapted to check if a threat of said buffer-storage device overflowing is imminent, and, if so, said control apparatus is adapted to cause data stored in said buffer-storage device to be transferred to said second memory device.

17. The programmable unit according to claim 15, wherein said control apparatus is adapted to check if a threat of said buffer-storage device becoming empty is imminent, and, if so, said control apparatus is adapted to cause data moved to said second memory device to be transferred back to said buffer-storage device.

18. The programmable unit according to claim 17, including a bus connected to said buffer-storage device and to said second memory device, said bus adapted to transfer data between said buffer-storage device and said second memory device, said control apparatus adapted to automatically receive, without any separate check by said control apparatus, information regarding a current use status of said bus.

19. The programmable unit according to claim 18, wherein said control apparatus is adapted to cause data transfer between said buffer-storage device and said second memory device to be carried out in phases during which said bus is not being used.

20. The programmable unit according to claim 18, wherein said control apparatus is adapted to request allocation of said bus to carry out required data transfer between said buffer-storage device and said memory device if a sufficient number of time periods are not available for use by said buffer-storage device or said second memory device.

21. The programmable unit according to claim 15, wherein said command execution units are each adapted to execute at least one of the commands simultaneously.

22. The programmable unit according to claim 15, wherein said buffer-storage device is adapted to buffer store the data emitted from said command execution units only when one of a predetermined list of events occurs.

23. The programmable unit according to claim 22, wherein said buffer-storage device is adapted to buffer-store data emitted from said command execution units only when one of commands and command groups regularly carried out immediately successively are not carried out immediately successively.

24. The programmable unit according to claim 23, wherein said buffer-storage device is adapted to buffer-store data emitted from said command execution units only when one of commands and command groups regularly carried out immediately successively are not carried out immediately successively due to an interrupt service routine being carried out therebetween.

25. The programmable unit according to claim 15, wherein the data stored in said buffer-storage device includes information about a destination to which the data is to be passed on to said first memory device.

26. The programmable unit according to claim 15, wherein the data stored in said buffer-storage device includes information from which a time at which the data is to be passed on to said first memory device can be determined.

27. A programmable unit, comprising:
a plurality of command execution units adapted to execute commands and to emit data;
a memory device connected to said command execution units and adapted to store data required for execution of the commands and to store the data emitted from said command execution units;
a buffer-storage device in the form of a stack, said buffer-storage device:
  connected to said command execution units and to said memory device;
  adapted to buffer store the data emitted from said command execution units, the data stored in said buffer-storage device including information about a destination to which the data is to be passed in said memory device; and
  said stack configured as a plurality of shadow stack elements, each of said plurality of command execution units being capable of writing to any of said shadow stack elements, as needed;
each of said command execution units adapted to write to said buffer-storage device data to be transferred to said memory device; and
said buffer-storage device adapted to transfer the data written to said buffer-storage device to said memory device at a later point in time.

28. A programmable unit, comprising:
a plurality of command execution units adapted to execute commands and to emit data;
a memory device connected to said command execution units and adapted to store data required for execution of the commands and to store the data emitted from said command execution units;
a buffer-storage device in the form of a stack, said buffer-storage device:
  connected to said command execution units and to said memory device;
  adapted to buffer store the data emitted from said command execution units, the data stored in said buffer-storage device including information used to determine a time at which the data is to be passed to said memory device; and
  said stack configured as a plurality of shadow stack elements, each of said plurality of command execution units being capable of writing to any of said shadow stack elements, as needed;
each of said command execution units adapted to write to said buffer-storage device data to be transferred to said memory device; and
said buffer-storage device adapted to transfer the data written to said buffer-storage device to said memory device at a later point in time.

* * * * *

UNITED STATES PATENT AND TRADEMARK OFFICE
CERTIFICATE OF CORRECTION

| | | |
|---|---|---|
| PATENT NO. | : 7,124,288 B2 | Page 1 of 1 |
| APPLICATION NO. | : 10/194899 | |
| DATED | : October 17, 2006 | |
| INVENTOR(S) | : Christian Panis et al. | |

It is certified that error appears in the above-identified patent and that said Letters Patent is hereby corrected as shown below:

Column 12,
Lines 11-12, "a buffer- storage device:" should read -- a buffer-storage device in the form of a stack, said buffer-storage device: --

Signed and Sealed this

Thirtieth Day of January, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,124,288 B2 | Page 1 of 1 |
| APPLICATION NO. | : 10/194899 | |
| DATED | : October 17, 2006 | |
| INVENTOR(S) | : Christian Panis et al. | |

It is certified that error appears in the above-identified patent and that said Letters Patent is hereby corrected as shown below:

Claim 15 Column 12,

Line12, "a buffer- storage device:" should read -- a buffer-storage device in the form of a stack, said buffer-storage device: --

Signed and Sealed this

Thirteenth Day of March, 2007

JON W. DUDAS
*Director of the United States Patent and Trademark Office*